Figure 1:
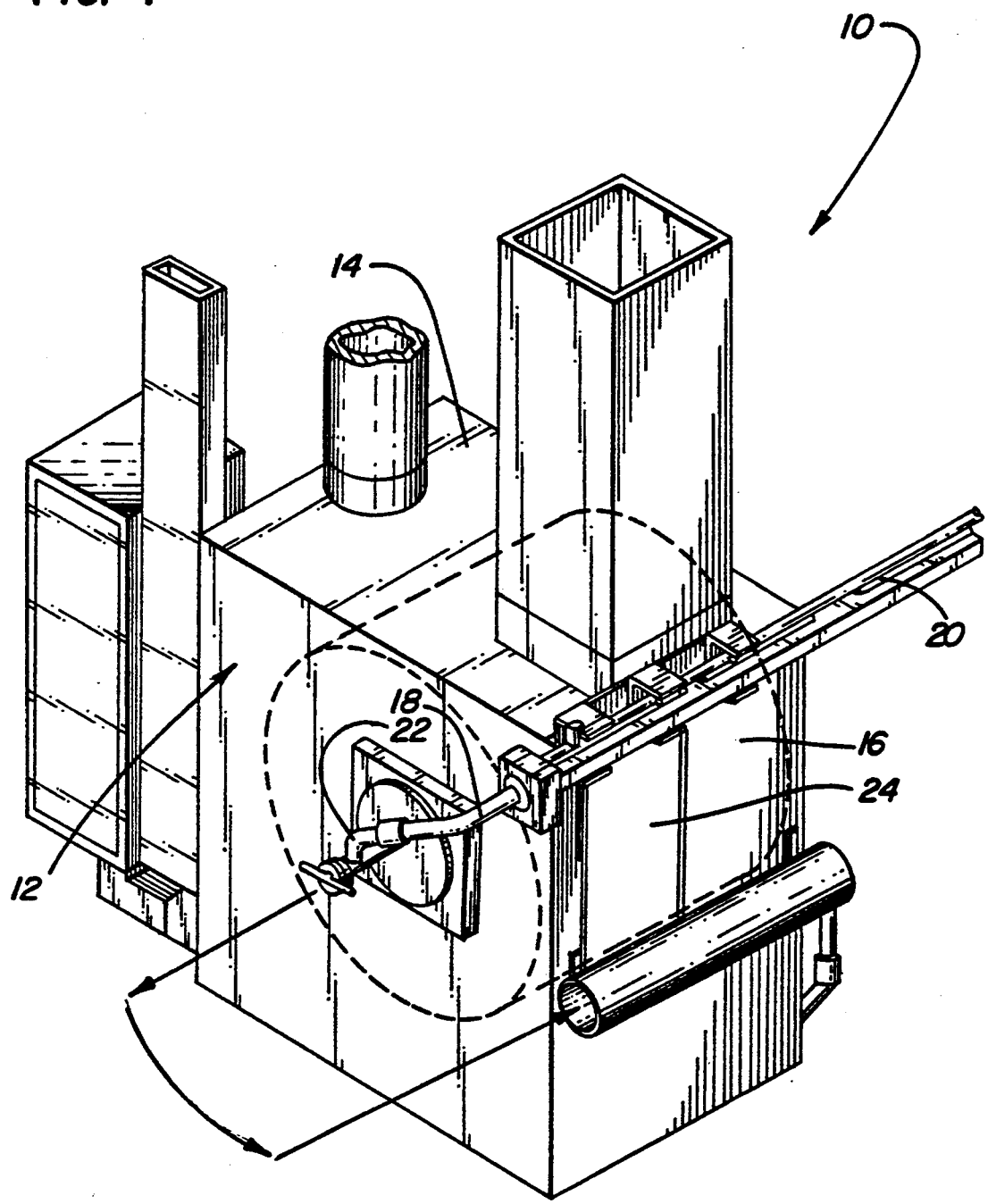

United States Patent [19]
Velez

[11] Patent Number: 5,441,565
[45] Date of Patent: Aug. 15, 1995

[54] SYSTEM FOR COATING PHARMACEUTICAL PRODUCTS

[75] Inventor: Miguel A. Velez, Guaynabo, Puerto Rico

[73] Assignee: McNeil-PPC, Inc., Milltown, N.J.

[21] Appl. No.: 991,069

[22] Filed: Dec. 15, 1992

[51] Int. Cl.⁶ .............................................. B05C 5/00
[52] U.S. Cl. ................... 118/24; 239/553.5; 239/562; 118/19; 118/303; 118/315
[58] Field of Search .................... 118/19, 24, 303, 315; 427/3, 424, 425; 239/556, 553.5, 562, 583

[56] References Cited

U.S. PATENT DOCUMENTS

| | | | |
|---|---|---|---|
| 3,237,872 | 3/1966 | Mincy | 239/566 |
| 3,251,341 | 5/1966 | Eburn, Jr. et al. | 118/315 |
| 4,365,585 | 12/1982 | Naylor et al. | 118/303 |
| 4,543,906 | 10/1985 | Glatt et al. | 118/19 |
| 4,596,205 | 6/1986 | Dunajtschik | 118/19 |
| 4,660,771 | 4/1987 | Chabert et al. | 239/694 |
| 4,766,839 | 8/1988 | Dunajtschik | 118/19 |
| 4,844,001 | 7/1989 | Jones | 118/24 |
| 5,074,244 | 12/1991 | Byers | 118/315 |
| 5,238,494 | 8/1993 | Dunajtschik | 118/19 |

FOREIGN PATENT DOCUMENTS

| | | | |
|---|---|---|---|
| 132480 | 2/1985 | European Pat. Off. | |
| 2482869 | 11/1981 | France | 118/19 |
| WO86/01442 | 3/1986 | WIPO | 118/315 |

*Primary Examiner*—W. Gary Jones
*Assistant Examiner*—Laura E. Edwards
*Attorney, Agent, or Firm*—Bernard F. Plantz

[57] ABSTRACT

An improved spray arm assembly for coating ingestible pharmaceutical products includes at least one spray nozzle of the type which is constructed and arranged to produce an aerosol mist from a liquid solution and pressurized gas, and an elongated support arm on which the spray nozzle is mounted. The support arm has a first bore defined therein for carrying liquid solution to the spray nozzle, and a second bore defined therein for carrying pressurized gas to the spray nozzle, so that liquid solution and compressed gas may be supplied to the spray nozzle with reduced head loss, better distribution and with less possibility of catastrophic leakage than was possible with tube-based equipment. A method for providing a gastroenteric coating onto an ingestible pharmaceutical product is also disclosed.

17 Claims, 4 Drawing Sheets

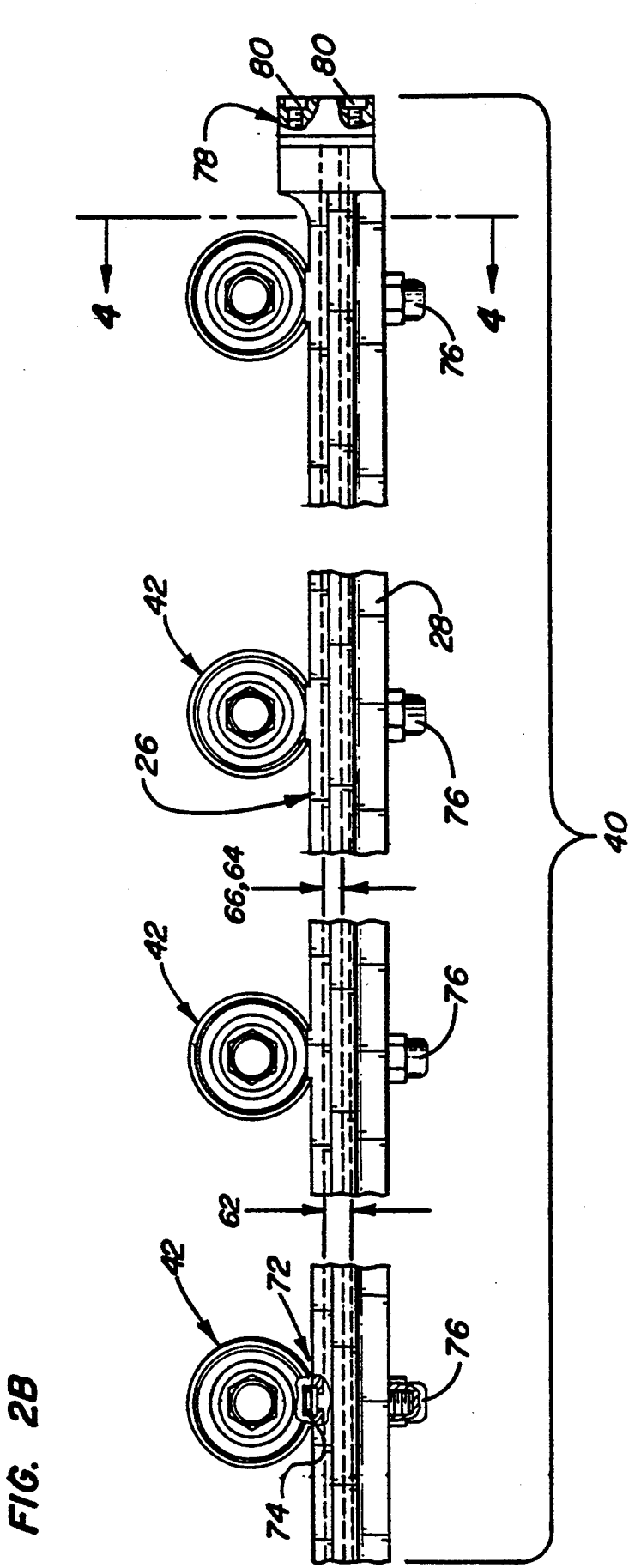

5,441,565

SYSTEM FOR COATING PHARMACEUTICAL PRODUCTS

BACKGROUND OF THE INVENTION

1. Field of the Invention

This invention relates to an improved coating pan assembly for coating ingestible pharmaceutical products. More specifically, this invention relates to an improved coating pan spray arm assembly which provides reduced head loss, better distribution and a lower risk of catastrophic leakage than spray arm assemblies which have been used in the past.

2. Description of the Prior Art

Currently available coating pans for medicament preparation include spray assemblies for applying coatings to tablets, for example, sugar coatings. Such coating pan assemblies are discussed in U.S. Pat. No. 4,844,001 to Jones, the disclosure of which is hereby incorporated into this document as if set forth fully herein.

In systems such as that disclosed in the Jones patent, a coating solution is sprayed onto uncoated pharmaceutical product with atomizing nozzles, which are mounted on arms which project through an access door to an interior of the coating pan. The coating solution, atomizing air, and control air are delivered to the nozzles with a manifold of tubing and fittings.

Although such systems are, in general, reliable, random failure of the solution tubing and fittings can sometimes result in leakage of solution onto the pharmaceuticals. When this happens, the entire lot of pharmaceuticals must be discarded. In addition, sagging of the distribution tubes and head loss caused by the tubes and fittings in the prior art spray arm assembly created the potential for non-uniform distribution of solution to the atomizing nozzles.

It is clear that there has existed a long and unfilled need in the prior art for an improved spray arm assembly for coating ingestible pharmaceutical products, which is less subject to leakage-causing failure, which provides a more uniform distribution of coating solution, and which is less subject to fluid pressure loss than the spray arm assemblies heretofore known.

SUMMARY OF THE INVENTION

Accordingly, it is an object of the invention to provide an improved spray arm assembly for coating ingestible pharmaceutical products, which is less subject to catastrophic leakage failure than spray arm assemblies heretofore known.

It is further an object of the invention to provide an improved spray arm assembly which provides more uniform spray distribution and reduced solution pressure loss than assemblies which have previously been known and used.

In order to achieve the above and other objects of the invention, an improved spray arm assembly for coating ingestible pharmaceutical products includes, according to a first aspect of the invention, at least one spray nozzle of the type which is constructed and arranged to produce an aerosol mist from a liquid solution and pressurized gas; and an elongated support arm on which the spray nozzle is mounted, the support arm having a first bore defined therein for carrying liquid solution to the spray nozzle, and a second bore defined therein for carrying pressurized gas to the spray nozzle, whereby liquid solution and compressed gas may be supplied to the spray nozzle with reduced head loss, better distribution and with less possibility of catastrophic leakage than was possible with tube based equipment.

According to a second aspect of the invention, an improved coating pan assembly for coating ingestible pharmaceutical products includes a coating pan unit including a chamber into which uncoated product may be introduced, the coating unit further including structure for introducing a hot drying gas into the chamber; a spray arm, the spray arm including at least one spray nozzle of the type constructed and arranged to produce an aerosol mist from a liquid solution and pressurized gas; and an elongated support arm on which the spray nozzle is mounted, the support arm having a first bore defined therein for carrying liquid solution to the spray nozzle, and a second bore defined therein for carrying pressurized gas to the spray nozzle; and positioning structure for positioning the spray arm within the chamber, whereby the support arm enables liquid solution and compressed gas to be supplied to the spray nozzle with reduced head loss, better distribution and with less possibility of catastrophic leakage than was possible with tube-based equipment.

According to a third aspect of the invention, a method of providing a gastroenteric coating onto an ingestible pharmaceutical product includes steps of (a) introducing uncoated product into a coating chamber; (b) introducing a coating solution into the coating chamber as an aerosol, the aerosol being generated without any tubes or fittings being exposed to the coating chamber; and (c) introducing a drying gas into the coating chamber to dry a coating onto a product.

These and various other advantages and features of novelty which characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described a preferred embodiment of the invention.

BRIEF DESCRIPTION OF THE DRAWINGS

FIG. 1 is a perspective view of an improved coating pan assembly constructed according to a preferred embodiment of the invention;

FIGS. 2A and 2B are fragmentary cross-sectional view of a spray arm assembly component of the coating pan assembly depicted in FIG. 1;

FIG. 3 is a fragmentary cross-sectional line taken along lines 3—3 in FIG. 2; and FIG. 4 is a fragmentary cross-sectional view taken along lines 4—4 in FIG. 2.

DETAILED DESCRIPTION OF THE PREFERRED EMBODIMENT(S)

Referring now to the drawings, wherein like reference numerals designate corresponding structure throughout the views, and referring in particular to FIGS. 1 and 2, an improved coating pan assembly 10 according to a preferred embodiment of the invention includes a conventional coating pan unit 12 having an outer housing 14 with an exterior surface 16. As may be seen in FIG. 1, a horizontal bar 18 is mounted for linear movement with respect to exterior surface 16 by a linear ball bearing track 20, in the manner disclosed in U.S. Pat. No. 4,844,001 to Jones.

Coating pan assembly 10 further includes a chamber 24 into which an uncoated product may be introduced. A support member 22 is connected at a first end to horizontal bar 18, and to a spray assembly 26 at a second, opposite end to support spray arm assembly 26 for insertion and withdrawal into chamber 24 via an access door, as will be described in greater detail below. Spray arm assembly 26 is shown in detail in FIGS. 2A, 2B, 3, and 4.

Looking again to FIGS. 2A and 2B, it will be seen that spray arm assembly 26 includes an elongate, rigid nozzle support arm 28, a connection portion 30 which is adapted to be connected to sources of coating solution, atomization air and control air, and a rotatable adjustable coupling 32, which allows for rotatable adjustment of support 28 with respect to the support member 22. A handle member 34 is secured to coupling 32 for gripping purposes during insertion or withdrawal of the spray arm assembly 26 into or out of chamber 24.

Referring again to FIGS. 2A and 2B, a circular insert 36 is provided in the outer access door that is provided in housing 14 to the chamber 24. A gasket member 38 is secured to door insert 36, and resiliently engages an outer circumference of nozzle support arm 28 to seal the chamber 24 at the location where nozzle support arm 28 enters the chamber 24. As may be seen in FIGS. 2 and 4, at least one nozzle assembly 42 is mounted on an elongated shaft portion 40 of nozzle support arm 28. Preferably, four such nozzle assemblies 42 are mounted on shaft 40 of nozzle support arm 28.

Figure 3:
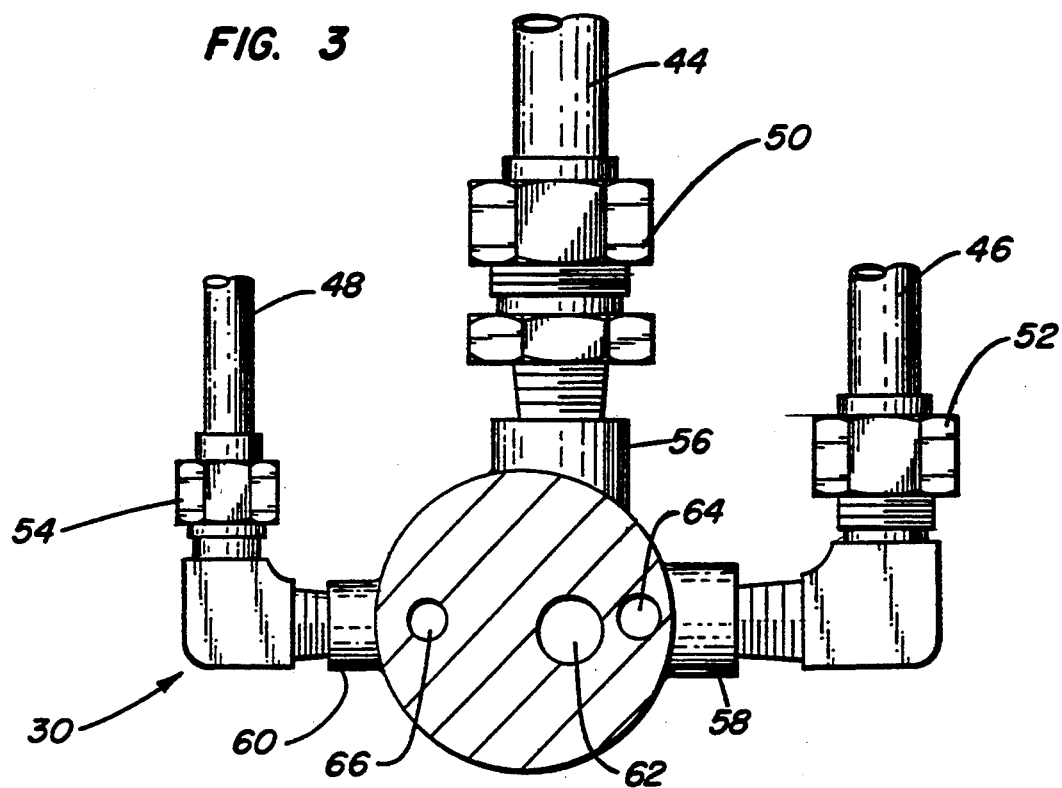

Referring briefly to FIG. 3, the connection portion 30 of spray arm 26 is adapted to connect spray arm 26 to a source 44 of coating solution, a source 46 of atomization air, and a source 48 of air which is used to provide on-off control to the various nozzle assemblies 42. As may be seen in FIG. 3, quick disconnect couplings 50, 52, 54 are used to connect inlets 56, 58, 60 in spray arm assembly 26, respectively, to the respective sources 44, 46, 48 of solution, atomization air and control air.

Figure 4:
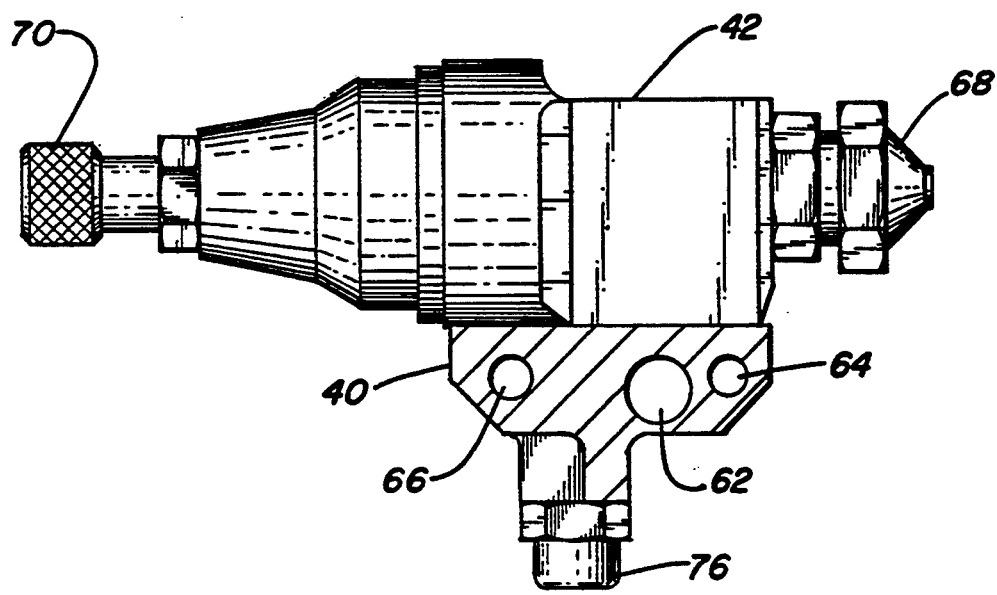

As may best be seen in FIGS. 3 and 4, the shaft 40 of nozzle support arm 28 has three different longitudinally extending bore holes 62, 64, 66 defined therein. Bore holes 62, 64, 66 preferably extend the length of shaft 40, and are all substantially parallel to a central axis of shaft 40. Bore 62 is intended for carrying coating solution, and is in communication with the inlet 56 in connection portion 30, and thus with the source 44 of coating solution. Bore hole 64 is intended for carrying atomization air, and is in communication with the inlet 58 in connection portion 30, and thus with the source 46 of atomization air. Bore hole 66 is intended for carrying control air, and is in communication with inlet 60 of connection portion 30, and thus with the source 48 of control air. The coating solution, atomization air and control air are carried exclusively by the respective bore holes 62, 64, 66, and no additional tubing or fittings are involved.

Preferably, shaft 40 is fabricated from a noncorrosive material which can be smoothly machined. Most preferably, shaft 40 is fabricated from medical grade stainless steel.

Referring now to FIG. 4, it will be seen that each nozzle assembly 42 includes a nozzle outlet 68, a pneumatically-controlled on-off valve and a adjustment valve screw 70. Nozzle assembly 42 are obtainable commercially, such as from Spray Systems Co. of Wheaton, Ill. as assembly model number 7310-1/4JAUPMCO-55-28 with a SUE-15-SS nozzle.

Figure 2A:
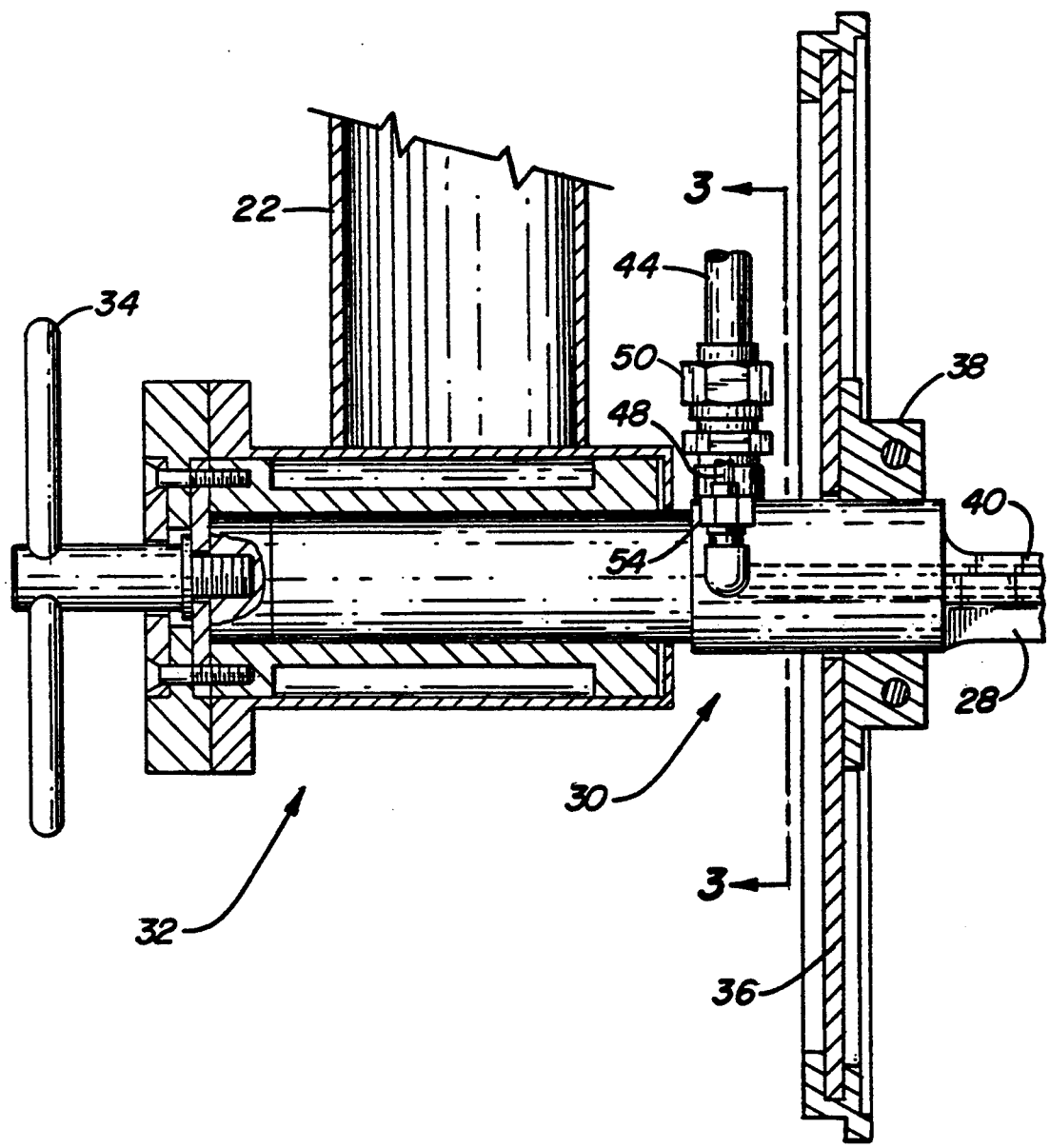

As may be seen in FIGS. 2A, 2B and 4, nozzle assemblies 42 are removably mounted to shaft 40 by sealing stems 72, which provide a sealed coupling for each of the respective bores 62, 64, 66 to the appropriate locations in nozzle assembly 42. Sealing stem 72 includes gasket 74, as may be seen in the cutaway view provided in FIGS. 2A and 2B. Most advantageously, each nozzle assembly 42 is removably mounted to shaft 40 by a mounting bolt and a removable nut 76. The removability of nozzle assembly 42 promotes efficient and thorough cleaning of spray assembly 26 during maintenance.

Looking again to FIGS. 2A and 2B, it will be seen that bore holes 62, 64, 66 extend the length of shaft 40, and that an end cap 78 is removably mounted to the distal end of shaft 40 by bolts 80. During cleaning of the spray arm assembly 26, end cap 78 may be removed, and bore holes 62, 64, 66 may be efficiently cleaned as a result of the improved access thereto provided by the removability of end cap 78. A gasket may be positioned between end cap 78 and shaft 40 for sealing purposes during use.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

What is claimed is:

1. A spray arm assembly for coating ingestible pharmaceutical products, comprising:
    at least one spray nozzle for producing an aerosol mist from a liquid solution and pressurized gas, said spray nozzle including a pneumatically-controlled on-off valve; and
    a support arm on which said spray-nozzle is mounted, said support arm having a first bore defined therein for carrying liquid solution to said spray nozzle, a second bore defined therein for carrying pressurized gas to said spray nozzle, a third bore defined therein for supplying a pneumatic input pressure to said spray nozzle, and a removable cap at the distal end thereof for providing access to said first and second bores.

2. An assembly according to claim 1, wherein said support arm is fabricated from stainless steel.

3. An assembly according to claim 1, wherein said spray nozzle is removably mounted to said support arm for ease of cleaning.

4. An assembly according to claim 1, wherein said first and second bores extend substantially parallel to a longitudinal axis of said support arm.

5. An assembly according to claim 1, wherein said assembly further comprises connection means coupled to said support arm for connecting said first and second bores to, respectively, a source liquid solution and a source of compressed gas.

6. An assembly according to claim 5, wherein said connection means comprises at least one quick-disconnect fitting.

7. An assembly according to claim 1, wherein at least two spray nozzles are provided.

8. A coating pan assembly for coating ingestible pharmaceutical products, comprising:
   a coating pan unit comprising a chamber into which uncoated product may be introduced, said coating unit further comprising means for introducing a drying gas into said chamber;
   a spray arm, said spray arm comprising at least one spray nozzle for producing an aerosol mist from a liquid solution and pressurized gas, said nozzle including a pneumatically-controlled on-off valve, and a support arm on which said spray nozzle is mounted, said support arm having a first bore defined therein for carrying liquid solution to said spray nozzle, a second bore defined therein for carrying pressurized gas to said spray nozzle, a third bore defined therein for supplying a pneumatic input pressure to said spray nozzle and a removable cap at the distal end thereof for providing access to said first and second bores; and
   positioning means connected to said spray arm for positioning said spray arm within said chamber.

9. An assembly according to claim 8, wherein said support arm is fabricated from stainless steel.

10. An assembly according to claim 8, wherein said spray nozzle is removably mounted to said support arm for ease of cleaning.

11. An assembly according to claim 8, wherein said first and second bores extend substantially parallel to a longitudinal axis of said support arm.

12. An assembly according to claim 8, wherein said assembly further comprises connection means coupled to said support arm and positioned outside the coating pan for connecting said first and second bores to, respectively, a source of liquid solution and a source of compressed gas.

13. An assembly according to claim 12, wherein said connection means comprises at least one quick-disconnect fitting.

14. An assembly according to claim 8, further comprising a gasket member engaging said support arm for sealing said support arm with respect to a wall of a coating pan unit.

15. An assembly according to claim 8, wherein at least two of said spray nozzles are provided.

16. An assembly according to claim 8, wherein said positioning means comprises a slide bearing support for permitting said support arm to be longitudinally inserted and withdrawn with respect to said chamber.

17. An assembly according to claim 8, wherein said positioning means further comprises means for permitting said support arm to be rotatably adjusted with respect to said chamber.

* * * * *